(12) United States Patent
Malin (10) Patent No.: US 8,857,208 B2
(45) Date of Patent: Oct. 14, 2014

(54) AUTOMATED SUBSTANCE STORAGE

(75) Inventor: Cosmas Malin, Mauren (LI)

(73) Assignee: Liconic AG, Mauren (LI)

( * ) Notice: Subject to any disclaimer, the term of this patent is extended or adjusted under 35 U.S.C. 154(b) by 978 days.

(21) Appl. No.: 12/051,020

(22) Filed: Mar. 19, 2008

(65) Prior Publication Data

US 2008/0231152 A1    Sep. 25, 2008

(30) Foreign Application Priority Data

Mar. 20, 2007    (CH) ........................ 0441/07

(51) Int. Cl.
| | |
|---|---|
| F25D 11/00 | (2006.01) |
| F25D 3/11 | (2006.01) |
| F25D 25/04 | (2006.01) |
| F25D 13/06 | (2006.01) |
| B65G 1/127 | (2006.01) |
| B65G 1/133 | (2006.01) |
| A47B 63/06 | (2006.01) |

(52) U.S. Cl.
CPC  *F25D 25/04* (2013.01); *F25D 3/11* (2013.01); *F25D 13/06* (2013.01); *B65G 1/127* (2013.01); *B65G 1/133* (2013.01); *A47B 63/062* (2013.01); *A47B 63/067* (2013.01); *A47B 63/06* (2013.01); *A47B 63/065* (2013.01)
USPC ............... 62/440; 62/266; 414/277; 236/1 B; 312/236; 312/301; 312/306; 312/312

(58) Field of Classification Search
CPC .... A47B 63/06; A47B 63/062; A47B 63/065; A47B 63/067; B65G 65/00; B65G 1/127; B65G 1/133; F25D 25/04; F25D 13/06; F25D 3/11; F25D 3/127; F25D 25/025
USPC ............ 62/266, 440; 236/1 B; 414/458, 459, 414/460; 312/236, 267, 306, 312
See application file for complete search history.

(56) References Cited

U.S. PATENT DOCUMENTS

| | | | |
|---|---|---|---|
| 4,643,879 | A | 2/1987 | Hanaway |
| 4,696,902 | A | 9/1987 | Bisconte |

(Continued)

FOREIGN PATENT DOCUMENTS

| | | |
|---|---|---|
| CH | 696326 (A5) | 4/2007 |
| DE | 2 254 218 | 5/1974 |

(Continued)

OTHER PUBLICATIONS

English Machine Translation of JP2007257735A.*

(Continued)

*Primary Examiner* — Marc Norman
*Assistant Examiner* — Paolo Gonzalez
(74) *Attorney, Agent, or Firm* — Greenblum & Bernstein, P.L.C.

(57) ABSTRACT

A climatic cabinet and storage cabinet that includes an upper zone, a lower zone, storage positions for storing objects in one of the upper and lower zone, and at least one temperature control unit structured and arranged to maintain a temperature in the one of the upper and lower zone different from the other of the upper and lower zone. The cabinet further includes a lock, a horizontal transport mechanism arranged at least in part in the other of the upper and lower zone to move the objects to and from the lock in a direction having a horizontal component, and a vertical transport mechanism structured and arranged to move the objects between the lower zone and the upper zone.

21 Claims, 7 Drawing Sheets

(56) References Cited

U.S. PATENT DOCUMENTS

| | | |
|---|---|---|
| 4,868,122 A | 9/1989 | Kominek et al. |
| 4,871,676 A | 10/1989 | Yamada |
| 5,139,384 A | 8/1992 | Tuttobene |
| 5,143,193 A | 9/1992 | Geraci |
| 5,192,506 A | 3/1993 | Kureshy et al. |
| 5,220,548 A | 6/1993 | Nakatsukasa et al. |
| 5,233,844 A | 8/1993 | Knippscheer et al. |
| 5,240,139 A | 8/1993 | Chirnomas |
| 5,266,272 A | 11/1993 | Griner et al. |
| 5,277,534 A | 1/1994 | Anderson et al. |
| 5,345,395 A | 9/1994 | Griner |
| 5,435,685 A | 7/1995 | Tsuda et al. |
| 5,449,229 A | 9/1995 | Aschenbrenner |
| 5,470,744 A | 11/1995 | Astle |
| 5,634,760 A * | 6/1997 | Anderson et al. .............. 414/268 |
| 5,733,024 A | 3/1998 | Slocum et al. |
| 5,735,587 A | 4/1998 | Malin et al. |
| 5,788,448 A | 8/1998 | Wakamori et al. |
| 5,961,323 A | 10/1999 | Lee |
| 6,027,190 A | 2/2000 | Stewart et al. |
| 6,036,812 A | 3/2000 | Williams et al. |
| 6,059,507 A | 5/2000 | Adams |
| 6,129,428 A | 10/2000 | Helwig et al. |
| 6,323,035 B1 * | 11/2001 | Kedar et al. ..................... 436/43 |
| 6,475,776 B1 | 11/2002 | Higuchi |
| 6,478,524 B1 | 11/2002 | Malin |
| 6,568,770 B2 | 5/2003 | Gonska et al. |
| 6,669,432 B2 | 12/2003 | Hamel et al. |
| 6,694,767 B2 | 2/2004 | Junca et al. |
| 6,752,479 B2 | 6/2004 | Ferger |
| 7,013,198 B2 | 3/2006 | Haas |
| 7,100,396 B2 | 9/2006 | Melching et al. |
| 7,214,023 B2 * | 5/2007 | Sato et al. ..................... 414/281 |
| 7,314,341 B2 | 1/2008 | Malin |
| 2001/0043031 A1 * | 11/2001 | Gonska et al. ................ 312/304 |
| 2003/0233842 A1 | 12/2003 | Junca et al. |
| 2004/0004415 A1 | 1/2004 | Melching |
| 2004/0115101 A1 | 6/2004 | Malin |
| 2004/0207303 A1 | 10/2004 | Melching et al. |
| 2004/0213651 A1 | 10/2004 | Malin |
| 2004/0256963 A1 * | 12/2004 | Affleck et al. ................ 312/209 |
| 2005/0007692 A1 * | 1/2005 | Thompson et al. ............. 360/93 |
| 2005/0069401 A1 | 3/2005 | Malin |
| 2005/0260102 A1 | 11/2005 | Angelantoni et al. |
| 2006/0006774 A1 | 1/2006 | Jackson et al. |
| 2006/0063122 A1 | 3/2006 | Heeg et al. |
| 2006/0070389 A1 | 4/2006 | Melching et al. |
| 2006/0177922 A1 * | 8/2006 | Shamah et al. ............ 435/286.2 |
| 2006/0289371 A1 | 12/2006 | Malin |
| 2008/0213080 A1 * | 9/2008 | Cachelin et al. ........... 414/791.6 |
| 2009/0026905 A1 | 1/2009 | Malin |
| 2009/0098642 A1 | 4/2009 | Kiyota et al. |

FOREIGN PATENT DOCUMENTS

| | | |
|---|---|---|
| DE | 38 25 451 | 2/1990 |
| DE | 199 03 958 | 1/2002 |
| DE | 101 40 958 | 4/2003 |
| EP | 0 035 452 | 9/1981 |
| EP | 1 441 026 | 7/2004 |
| EP | 1447 441 | 8/2004 |
| FR | 2 788 042 | 7/2000 |
| GB | 2 174 714 | 11/1986 |
| GB | 2 228 989 | 9/1990 |
| JP | 5-116708 | 5/1993 |
| JP | 2004 131249 | 4/2004 |
| JP | 2007257735 A * | 10/2007 |
| WO | 98/05753 | 2/1998 |
| WO | 2004/028572 | 4/2004 |
| WO | 2006/074568 | 7/2006 |
| WO | 2006/074569 | 7/2006 |
| WO | 2007/004445 | 1/2007 |

OTHER PUBLICATIONS

European Search Report dated Feb. 12, 2010 conducted in EP 08 00 4526.

Machine translation of Ch 696326.

* cited by examiner

AUTOMATED SUBSTANCE STORAGE

CROSS-REFERENCE TO RELATED APPLICATIONS

The present application claims priority under 35 U.S.C. §119 of Swiss Patent Application No. 0441/07, filed Mar. 20, 2007, the disclosure of which is expressly incorporated by reference herein in its entirety.

BACKGROUND OF THE INVENTION

1. Field of the Invention

The invention relates to a climatic cabinet or storage cabinet with an upper zone and a lower zone, and storage positions for storing objects in one of the lower and upper zone.

2. Discussion of Background Information

With the increasing degree of automation in medical engineering, there is a rising need to be able to manage substances from long-term storage automatically. To avoid chemical changes in the substances, they are often stored at the lowest temperatures possible. The temperature ranges below −80° C. are of increasing importance here. The transport of storage articles at these extremely low temperatures makes special demands on the mechanics and control of a storage system.

Known systems use a transport robot that is arranged in a moveable manner in an aisle between shelves with drawers. The robot is able to pull out the drawers and remove the contents therefrom. The robot thereupon moves to a periphery at the end of the aisle. The robot thereby moves between the shelves only when access takes place. The region of the periphery has a higher temperature than the region of the racks.

Another system, which is described in U.S. Pat. No. 6,694, 767, has cassettes arranged in a chest that can be drawn out vertically. A gripper removes the storage articles from the drawn-out container and transports them to the periphery. The upper region of the arrangement is warmer than the lower.

The disadvantage of the known systems is that either they are suitable exclusively for large storage facilities, or that they leave a large amount of space unused. Furthermore, with the known arrangements it is not easy to integrate processing devices in a space-saving manner while maintaining the footprint.

SUMMARY OF THE INVENTION

In a first aspect of the invention, a storage system is provided that is suitable for low temperatures and small devices. In accordance with the invention, a vertical transport mechanism is therefore provided, with which the objects can be transported between the lower—colder zone—and the upper—warmer zone. The objects are transported to a lock in a horizontal or tilted direction by a horizontal transport mechanism, which is located at least in part in the upper zone.

The vertical transport mechanism is preferably formed by a transport lifting device or a rotary elevator system.

The storage system presented is particularly suitable for small and medium storage sizes as well as storage systems with integrated processing devices. A good use of space and simple and cost-effective solutions for the transport mechanisms are of prime importance with systems of this size.

In a second aspect of the invention, a climatic cabinet is suitable in particular for very high temperatures. According to the invention, at least one heater is provided in the upper zone, with which heater at least the upper zone is heated and a higher temperature is generated in the upper zone than in the lower zone. Furthermore, a transport mechanism is provided with which the objects can be moved to and fro between the upper zone and the lock.

In a third aspect of the invention, a storage cabinet, in particular a climatic cabinet for laboratory material, permits a compact storage of laboratory material, in particular microtitration plates.

According to the invention, several horizontally moveable supports, which support the storage sites, are arranged in the storage zone. The supports are displaceable such that the formation of a transport gap to accommodate the lift carriage is rendered possible with each support. The transport capacity can thus be increased in the horizontal direction.

The invention is directed to a climatic cabinet that includes an upper zone, a lower zone, storage positions for storing objects in one of the upper and lower zone, and at least one temperature control unit structured and arranged to maintain a temperature in the one of the upper and lower zone different from the other of the upper and lower zone. The cabinet further includes a lock, a horizontal transport mechanism arranged at least in part in the other of the upper and lower zone to move the objects to and from the lock in a direction having a horizontal component, and a vertical transport mechanism structured and arranged to move the objects between the lower zone and the upper zone.

According to a feature of the invention, the at least one temperature control unit may include at least one refrigeration unit, the storage positions for storing objects can be located in the lower zone, and the lower zone can be cooled to a temperature lower than that in the upper zone.

In accordance with another feature of the instant invention, the at least one temperature control unit can include at least one heater unit, the storage positions for storing objects may be located in the upper zone, and the upper zone can be heated to a temperature higher than that in the lower zone.

According to still another feature of the invention, the vertical transport mechanism can include a lifting device. Further, the lifting device may include a lift column extending from the upper zone into the lower zone, and the lifting column may be attached in the upper zone. The lifting device can be horizontally movable in a first and in a second direction. The cabinet can also include a plurality of supports arranged in the lower zone to support the storage positions and to be movable horizontally, and the plurality of supports may be displaceable to form a transport gap between neighboring supports to accommodate the lifting device. The cabinet may also include a supporting frame of the upper frame. The supports may be suspended in a displaceable manner on the supporting frame. The cabinet may also include a plurality of cassettes positionable in the lower zone, such that each cassette comprises several storage positions one above the other. Moreover, the cabinet can include a plurality of supports to support the plurality of cassettes, so that a number of the plurality of cassettes are positionable next to one another in each support. The lifting device may include a scoop structured and arranged to be pivotable about a vertical axis, and the plurality of cassettes can be arranged in a star-shaped manner around the lifting device. Moreover, the cabinet may include at least one rotary plate, so that the plurality of cassettes are positionable on the at least one rotary plate. The cabinet can also include a rotary plate suspension connected to a rotary plate drive in the upper zone. The at least one rotary plate can be suspended on the rotary plate suspension.

In accordance with the present invention, the climatic cabinet can include at least one rotary elevator is arranged in the lower zone. The rotary elevator may include gondola-like supporting platforms structured to receive the objects. The at least one rotary elevator may include a plurality of rotary elevators arranged next to one another in the lower zone. The climatic cabinet can also include a pull-down claw arranged in the upper zone that is positionable above each rotary elevator to seize an object.

The climatic cabinet may also include at least one processing device arranged in the upper zone being structured and arranged to receive at least one object.

According to still another feature of the invention, the climatic cabinet can include a cooling vat, such that the storage positions are arranged in the cooling vat.

In accordance with a further feature of the invention, the lock can be arranged in the upper zone.

According to another feature of the instant invention, the climatic cabinet can also include a dryer in the upper zone.

According to another feature of the invention, the climatic cabinet can include at least one user door arranged, in the upper zone.

The present invention is directed to a climatic cabinet that includes an upper zone, a lower zone, storage positions structured and arranged to store objects in the upper zone, and at least one heater structured and arranged to heat at least the upper zone, so that a temperature in the upper zone is higher than a temperature in the lower zone. A lock is arranged in the lower zone and a transport mechanism is structured and arranged to move the objects between the upper zone and the lock.

According to a feature of the instant invention, the transport mechanism can include a horizontal transport mechanism and a vertical transport mechanism. Further, the vertical transport mechanism can be structured and arranged to move the objects between the upper zone and the lower zone, and the horizontal transport mechanism may be structured and arranged to move the objects horizontally or obliquely to the lock.

In accordance with another feature, the transport mechanism may include a lift column extending from the lower zone into the upper zone. The lift column can be attached in the lower zone.

According to another feature of the invention, a storage cabinet can include the climatic cabinet discussed above, and the lift column may be structured and arranged to move horizontally in a first and in a second direction.

A storage cabinet for laboratory articles includes a storage zone having storage positions for storing the laboratory articles, a transport mechanism having a lift carriage movable horizontally and vertically for accessing the storage positions of the storage zone, and a plurality of horizontally moveable supports arranged in the storage zone to support the storage positions. The supports are horizontally displaceable to form a transport gap between supports to accommodate the lift carriage.

According to a feature of the invention, each support can provides space for several storage positions above one another and next to one another.

In accordance with another feature of the present invention, the storage cabinet may include a plurality of cassettes arranged next to one another in a direction X at each support. Each cassette can form several storage positions one above the other. The direction X can be perpendicular to a horizontal direction Y in which the supports can be horizontally displaceable.

According to still another feature of the invention, the transport gap can form an aisle in direction Y, into which a lift column of the transport mechanism is horizontally movable. Moreover, the storage cabinet can further include a lift carriage arranged on the lift column.

According to still another feature, each support can include a translation drive with which it can be displaced horizontally.

In accordance with a further feature of the instant invention, the storage zone may be located in a lower zone arranged below an upper zone, and the supports can be suspended in the upper zone. Further, the supports may be suspended on two guides lying opposite one another.

The invention is directed to a climatic cabinet that includes an upper zone, a lower zone, storage positions structured and arranged to store objects in the upper zone, and at least one refrigeration unit structured and arranged to cool at least the lower zone, such that a temperature in the lower zone is cooler than a temperature in the upper zone. A lock is arranged in the upper zone and a transport mechanism is structured and arranged to move the objects between the lower zone and the lock.

In accordance with yet another feature of the invention, the transport mechanism may include a horizontal transport mechanism and a vertical transport mechanism. Further, the vertical transport mechanism can be structured and arranged to move the objects between the upper zone and the lower zone, and the horizontal transport mechanism can be structured and arranged to move the objects horizontally or obliquely to the lock.

The invention is directed to a method of transporting objects in a climatic cabinet having an upper zone, a lower zone, and storage positions for storing objects in one of the upper and lower zone. The method includes maintaining a temperature in the one of the upper and lower zone different from the other of the upper and lower zone, moving objects at least in part in the other of the upper and lower zone to move the objects to and from a lock in a direction having a horizontal component, and moving the objects between the lower zone and the upper zone.

According to another feature of the invention, the temperature in the one of the upper and lower zone can be maintained with at least one refrigeration unit, the storage positions for storing objects may be located in the lower zone, and the lower zone may be cooled to a temperature lower than that in the upper zone.

In accordance with still yet another feature of the present invention, the temperature in the one of the upper and lower zone may be maintained with at least one heater unit, the storage positions for storing objects can be located in the upper zone, and the upper zone can be heated to a temperature higher than that in the lower zone.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
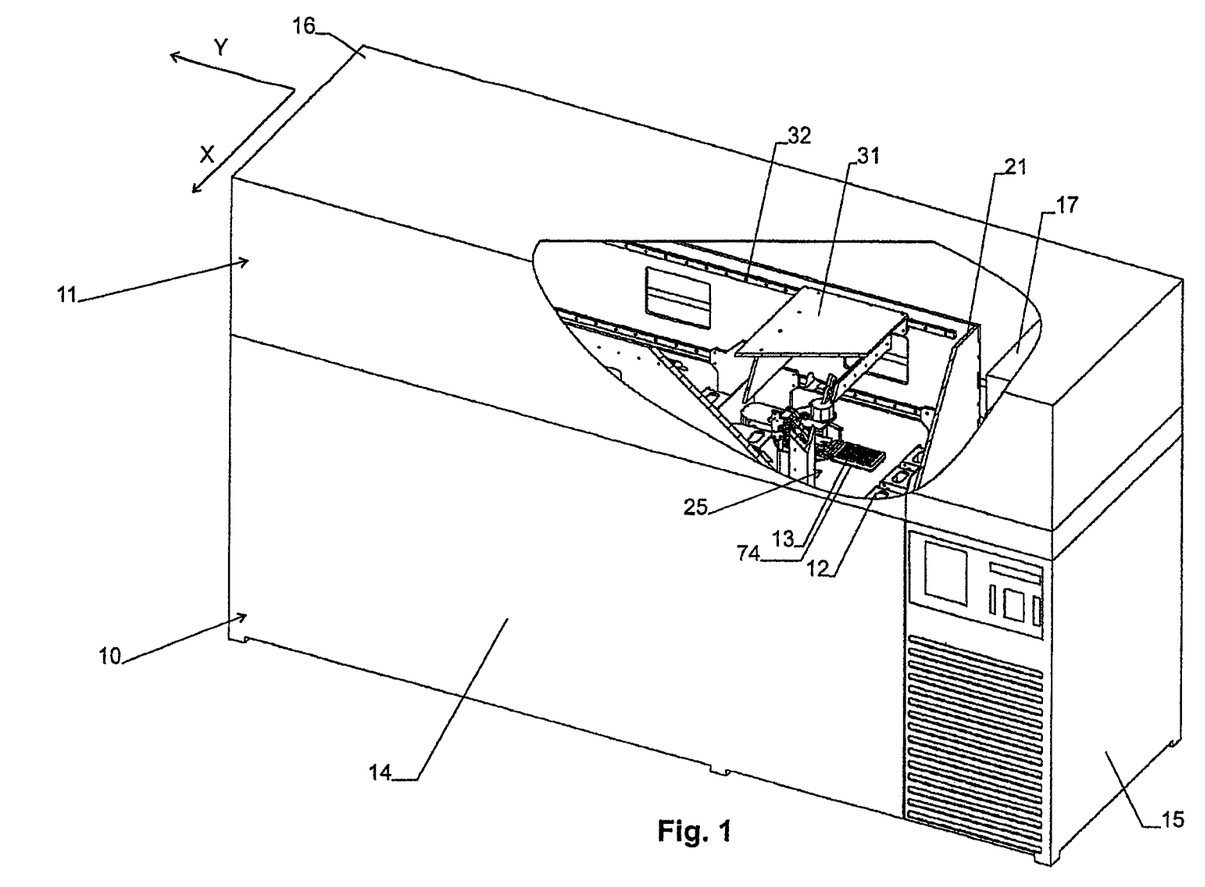
FIG. 1 illustrates a first view of a climatic cabinet.
Figure 2:
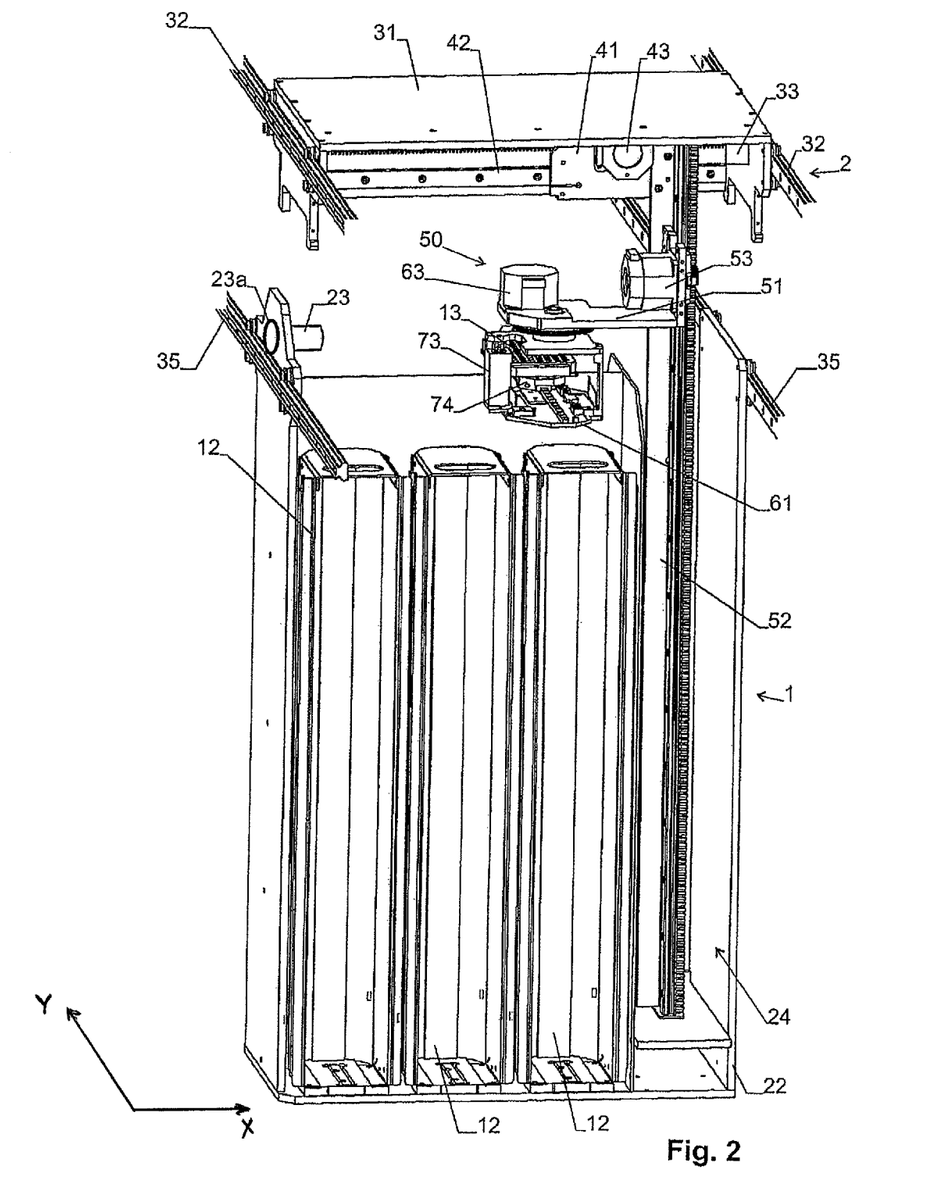
FIG. 2 illustrates a shelf and the transport lift of the embodiment according to FIG. 1.

FIGS. 1 and 2 show a first embodiment of a climatic cabinet with a lower zone 10 and an upper zone 11. The storage articles are stored in removable cassettes 12 in lower zone 10, which forms a storage zone of the device. Each cassette 12 provides space to accommodate several objects 13 to be stored one above the other. Objects 13 are preferably so-called microtitration plates. However, the present invention can also be used to store other laboratory articles, such as e.g., bottles, dishes, test tubes, etc.

In lower zone 10, the climatic cabinet forms a cooling vat 14, in which a low temperature is maintained by a refrigeration unit 15. A low-temperature storage is thus rendered possible, while the components in upper zone 11 are exposed to temperatures that are not as low.

Upper zone 11 is covered by a cover 16 and is likewise cooled, albeit to a temperature that is not as low. A dryer 17 is provided in upper zone 11 to extract moisture from the atmosphere within the climatic cabinet to prevent the components from icing. Dryer 17 is a cooling device through which the air in the climatic cabinet is guided and in which the air is brought to a temperature that is lower than the temperature in the other parts of the device. Moisture is thus extracted from the air in a targeted manner and at a defined location.

Cassettes 12 rest on shelf-like supports 22 arranged next to one another, each support 22 being able to accommodate several, preferably at least three, cassettes 12 next to one another in a horizontal direction X, i.e., each support has room for a plurality of storage-positions next to one another and above one another. In the lower zone 10 several supports 22 are provided, arranged next to one another in a horizontal direction Y, the direction Y being perpendicular to the direction X.

Supports 22 are suspended in a manner displaceable in direction Y on guides 35 lying opposite one another on a supporting frame 21 of upper zone 11. The number of supports 22 is selected such that they fill the space available to them in the direction Y apart from a transport gap 25. By displacement of individual supports 22 in the direction Y, transport gap 25 can be formed in front of each of supports 22, so that the transport mechanism described later can access the storage positions in cassettes 12.

A lifting device 50 is suspended in upper zone 11. Lifting device 50 is arranged on supporting frame 21 so as to be horizontally moveable in direction Y along supports 22 by a longitudinal shift table 31 and in the direction X between supports 22 by a transverse shift table 41. Longitudinal shift table 31 is attached on longitudinal guides 32 to supporting frame 21 and can be moved in direction Y with a longitudinal shift drive 33. Transverse shift table 41 is attached to a transverse guide 42 on longitudinal shift table 31 and can be moved in direction X with a transverse shift drive 43.

Lifting device 50 supports a lift carriage 51 moveable in height. A rotary table 61, which can be pivoted about a vertical axis by a semirotary actuator 63, is arranged on lift carriage 51.

A transport scoop 74 horizontally moveable via a scoop drive 73 is arranged on rotary table 61. During the transport; a storage object 13 respectively lies on transport scoop 74.

For access to the storage articles, lifting device 50 is moved along supports 22 to transport gap 25. Lift carriage 51 can now be moved into transport gap 25 between supports 22 to the desired storage position for storage object 13. For longitudinal movement, the supports have an aisle 24 through which lift column 52 of transport lift 50 can be moved horizontally in direction Y.

Supports 22 are suspended on guides 35 in upper zone 11. A sliding device comprising a translation drive 23 and a slide sprocket 23a is provided in upper zone 11 to displace supports 22 in direction Y.

A lock, i.e., an air-lock, (not shown in FIGS. 1 and 2) that can be operated automatically is arranged on an outer wall of upper zone 11 at the height of support frame 21. Lock 81 separates the climate in the usable space interior from the surrounding climate. The lifting device transports the storage articles through the lock.

Figure 3:
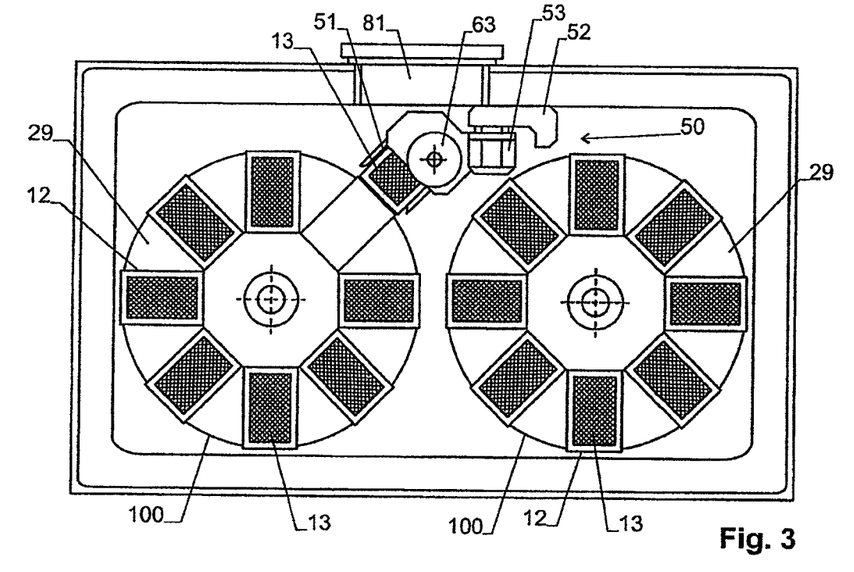
FIG. 3 illustrates a second embodiment of a climatic cabinet from above with cover removed.
Figure 4:
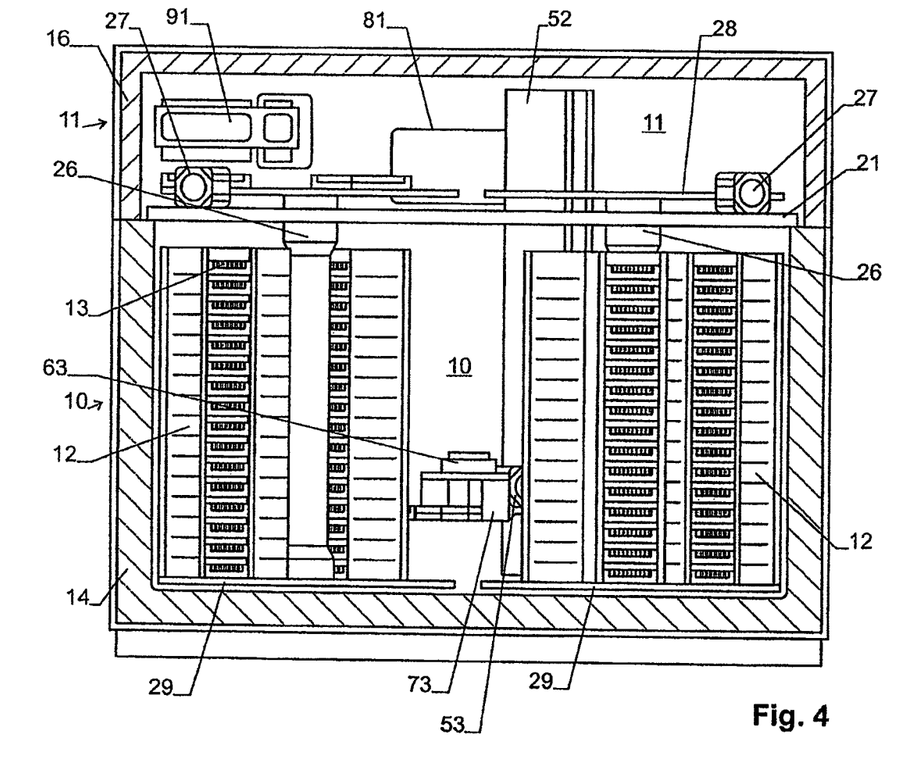
FIG. 4 illustrates a vertical section through the climatic cabinet according to FIG. 3.

A second exemplary embodiment of the climatic cabinet is shown in FIGS. 3 and 4 and uses two carousels 100 to accommodate the storage articles. Carousels 100 are arranged in lower zone 10. Removable cassettes 12 are positioned in a star-shaped manner on a rotary plate 29 of each carousel 100. Cassettes 12 in turn are used to accommodate the storage articles, in that each cassette 12 provides space for several objects 13 one above the other. Each rotary plate 29 is suspended and pivoted on a vertical rotary rod 26 on supporting frame 21 of upper zone 11. Each carousel 100 can be rotated relative to lifting device 50 by a rotary plate drive 27 in upper zone 11 such that each cassette 12 can be positioned at lifting device 50. Lifting device 50 is arranged laterally between carousels 100.

Lifting device 50 is likewise attached to supporting frame 21 in upper zone 11. It has a vertical drive 53, a semirotary actuator 63 and a horizontal sliding device, driven by a scoop drive 73. A lift carriage 51 is supported on a lift column 52 and vertically moveable with the vertical drive 53. The traverse of the lift carriage 51 extends from the height of the rotary plate 29 to above supporting frame 21.

A lock 81 is provided on the vertical side wall in upper zone 11 of the climatic cabinet to allow objects 13 to be exchanged with the environment.

Figure 5:
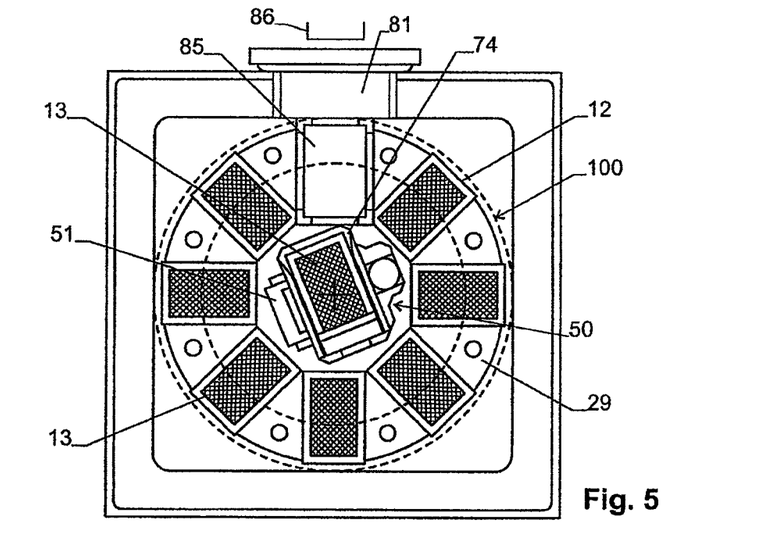
FIG. 5 illustrates a third embodiment of a climatic cabinet from above with cover removed.
Figure 6:
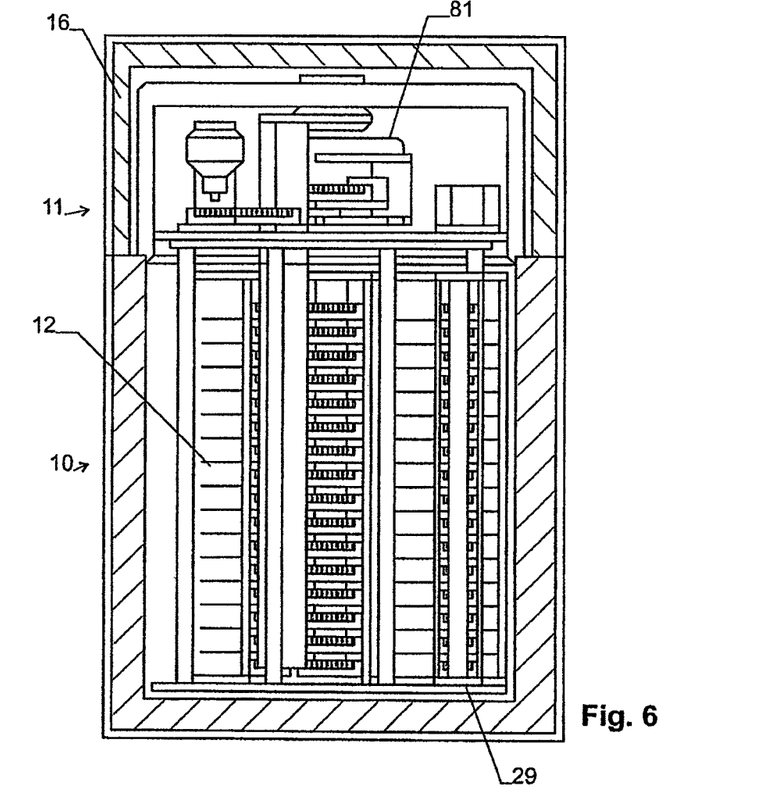
FIG. 6 illustrates a vertical section through the climatic cabinet according to FIG. 5.

In a third exemplary embodiment, which is shown in FIGS. 5 and 6, only one carousel 100, which is in turn arranged in the lower zone 10, is used by way of example. A lifting device 50 is arranged in the turning center of carousel 100. The storage articles are located in removable cassettes 12, which are arranged concentrically on rotary plate 29 and in a star-shaped manner around lifting device 50.

Lifting device 50 has a scoop 74, which can be pivoted about the carousel axis and moved vertically parallel to the carousel axis and extended horizontally. Scoop 74 is arranged on lift carriage 51.

To transport a storage object 13, lifting device 50 rotates with scoop 74 to cassette 12 in which the desired storage object is located. Lift carriage 51 moves to the tier of the cassette with the storage object. Scoop 74 is extended and the object 13 is loaded. Lift carriage 51 brings storage object 13 from lower zone 10 with cassettes 12 to upper zone 11 in which the automatically actuatable lock 81 is located.

Figure 7:
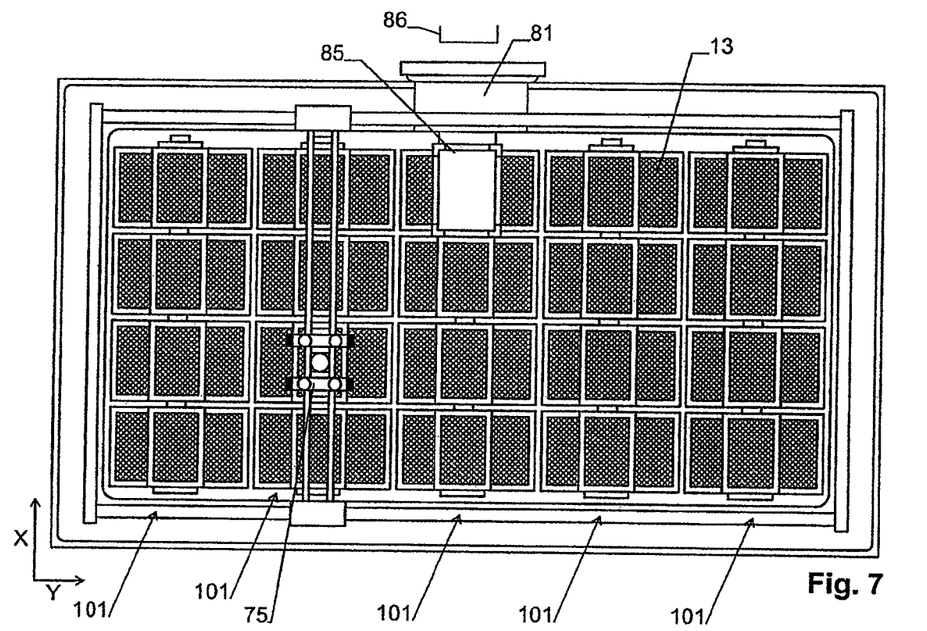
FIG. 7 illustrates a fourth embodiment of a climatic cabinet from above with cover removed.
Figure 8:
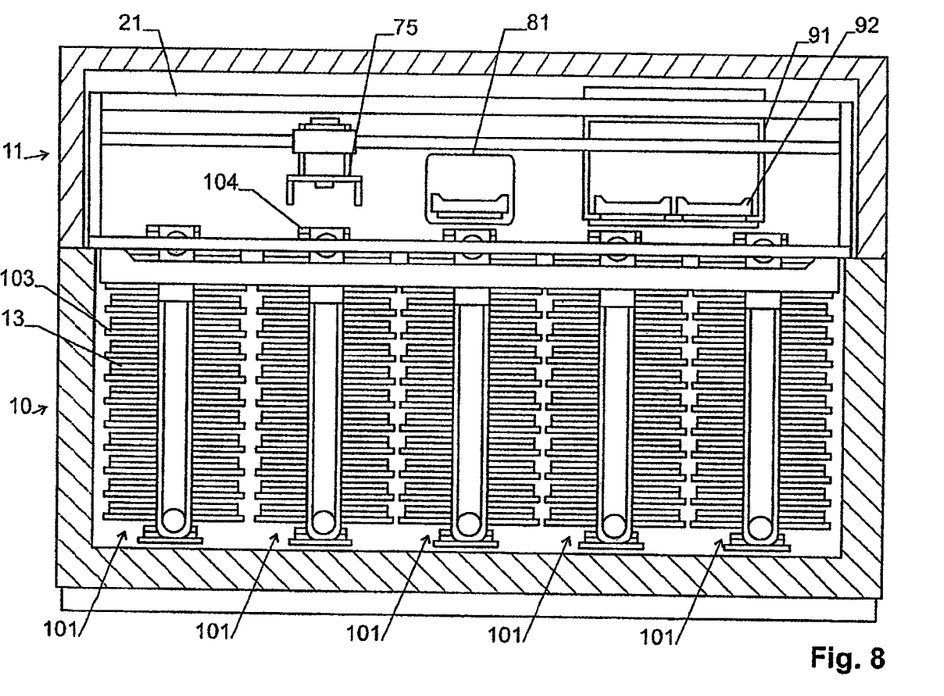
FIG. 8 illustrates a vertical section through the climatic cabinet according to FIG. 7.

In a fourth exemplary embodiment, which is shown in FIGS. 7 and 8, the storage articles are accommodated in a rotary elevator system. The rotary elevator system comprises a plurality of rotary elevators 101, which are arranged in lower zone 10. Each rotary elevator 101 contains a plurality of gondola-type support platforms 103 for objects 13. Support platforms 103 are guided such that they move upwards and downwards along closed transport paths along the sides of the rotary elevator and can be moved at the top and at the bottom of the rotary elevator from one side of the rotary elevator to the other side of the rotary elevator. Supporting platforms 103 are thereby moved only with a parallel motion and not tilted.

As can be seen from FIGS. 7 and 8, on each rotary elevator 101 several transport paths for supporting platforms 103 are preferably provided next to one another in the X direction. In the Y direction, several rotary elevators 101 are arranged next to one another.

The rotary elevator system is suspended on supporting frame 21, which is arranged in upper zone 11. Furthermore, in upper zone 11 a pull-down claw 75 is provided, which can be moved over each transport path of rotary elevator 101. To this end, pull-down claw 75 is horizontally movable in direction X and Y. For access to a desired storage position, supporting platform 103 is brought to upper top point 104 of its transport path, and rotary elevator 101 is set in motion until the desired storage position is in top position 104. Pull-down claw 75 is positioned above supporting platform 103 so that storage object 13 can be picked up from storage platform 103 at top position 104 of the respective rotary elevator 101 and transported to lock 81, or vice versa.

For transport through lock 81, a deposit position 85 and a transfer position 86 are provided in the embodiment according to FIGS. 7 and 8. Deposit position 85 is located inside lock 81 and transfer position 86, outside. A suitable transfer mechanism is provided with which the respective object can be transported between deposit position 85 and transfer position 86.

Furthermore, in FIG. 8 a processing device 91 is indicated in upper zone 11. It has at least one receiving table 92, which can receive one or more of objects 13. Above receiving table 92, a processing mechanism is provided (not shown), such as, e.g., an optical analysis system with which the manipulations can be performed on objects 13, or on the samples located therein, on receiving table 92.

In all of the exemplary embodiments described so far, the climatic cabinet is divided into a lower zone 10 and an upper zone 11, and a refrigerator 15 is provided, which makes it possible to maintain a much lower temperature in lower zone 10 than in upper zone 11. The temperature in lower zone 10 is preferably below −30° C., in particular approx. −80° C., while in upper zone 11 it is preferably above −30° C., e.g., −20° C., so that mechanical components, cable insulations, sensors, etc., still function without special measures.

Moreover, in lower zone 10 storage locations are provided for storing objects 13. For access to objects 13 at the storage positions in lower zone 10, a vertical transport mechanism is provided to enable vertically shifting objects 13 between lower zone 10 and upper zone 11. In the embodiments according to FIGS. 1 through 6, the vertical transport mechanism is formed by lifting device 50, in the embodiment according to FIGS. 7 and 8, by rotary elevators 101.

Lock 81 and at least a part of a horizontal transport mechanism are provided in upper zone 11. The horizontal transport mechanism makes it possible to convey objects 13 in a horizontal or oblique direction between the vertical transport mechanism and lock 81. "Oblique direction" thereby means a direction with a horizontal component. If the vertical and horizontal transport mechanisms are formed at least in part by the some components, no explicit transfer of the object between vertical and horizontal transport mechanism need thereby occur.

In the embodiment according to FIGS. 1 and 2, the horizontal transport mechanism is formed by longitudinal shift table 31, longitudinal guide 32, longitudinal shift drive 33 and transverse shift table 41, transverse guide 42 and transverse shift drive 43; in the embodiment according to FIGS. 3 and 4 by lift carriage 51 and scoop 74; in the embodiment according to FIGS. 5 and 6 likewise by lift carriage 51 and scoop 74 and by the parts 85 and 86 and the transport mechanism arranged between them; and in the embodiment according to FIGS. 7 and 8 by pull-down claw 75, which is horizontally moveable in direction X and Y, as well as by the parts 85 and 86 and the transport mechanism arranged between them.

Figure 9:
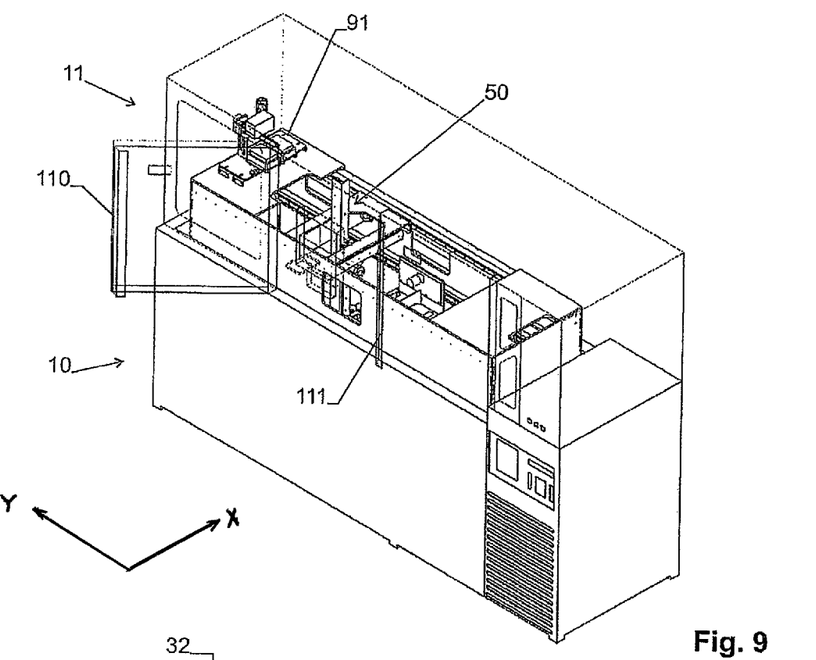
FIG. 9 illustrates a variant of the embodiment according to FIG. 1 with processing device.
Figure 10:
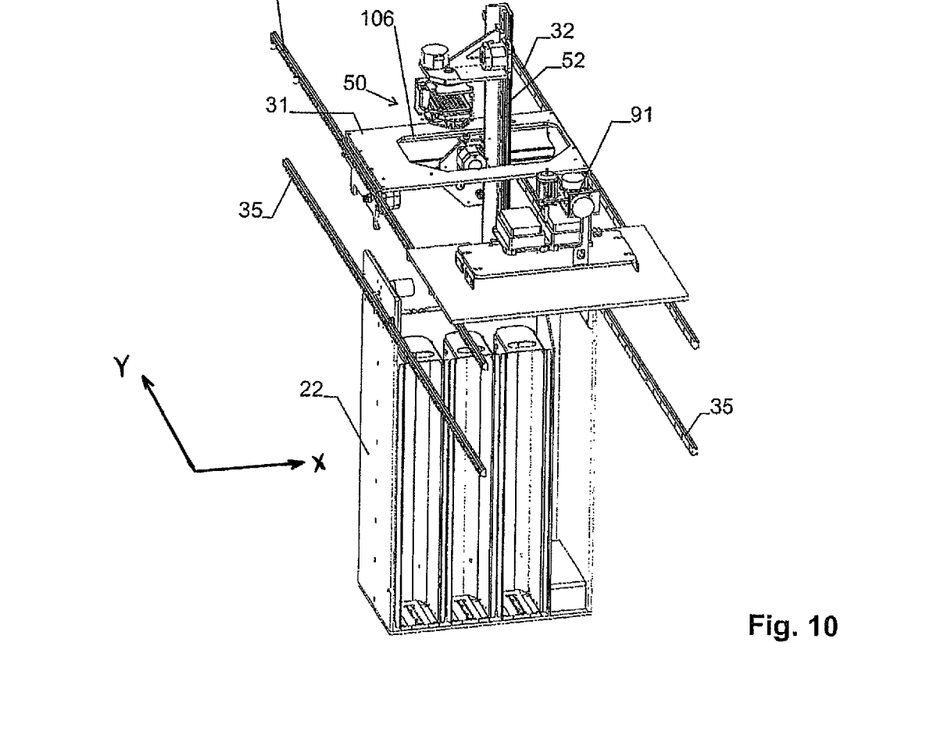
FIG. 10 illustrates the arrangement of the transport lifting device and the processing device of the embodiment according to FIG. 9.

Another embodiment of the invention is shown in FIGS. 9 and 10. This largely corresponds to the embodiment according to FIGS. 1 and 2, so that only the differences are described below.

As can be seen from FIG. 9, in this embodiment two user doors 110 and 111 are arranged in cover 16, which doors provide access to the components arranged in upper zone 11.

User door 110 is arranged at a processing device 91. It is extended at the top compared to the embodiment in FIGS. 1 and 2 so that lifting device 50 can bring objects 13 to the processing device 91 or pick them up from there. To this end an opening 106 is provided in longitudinal shift table 31, through which opening lift column 52 projects.

Figure 11:
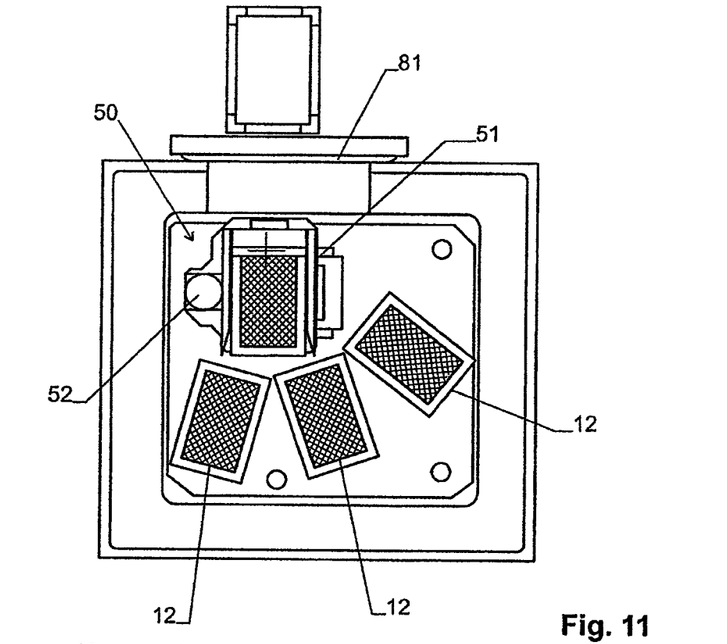
FIG. 11 illustrates another embodiment with stationary cassettes seen from above.

FIG. 11 shows an embodiment of a somewhat smaller device with only three stationary cassettes 12. It corresponds approximately to the device described in FIG. 3 of U.S. Pat. No. 6,478,524, but the climatic cabinet, as in the previous embodiment, is divided into a lower and an upper zone, a lower temperature prevailing in the lower zone than in the upper zone. Cassettes 12 are arranged in the lower zone 10. Lift column 52 of lifting device 50 extends from the lower into the upper zone so that lift carriage 51 can move objects 13 to and fro between the two zones. Lock 81, as, e.g., in the embodiment according to FIGS. 9 and 10, is arranged in the upper zone 11, so that an opening of the same does not disturb the temperature balance in the lower zone 10.

An arrangement with exactly one cassette or with two cassettes or with a larger number of cassettes is also conceivable.

In all of the embodiments shown so far, the cabinet has divided into two zones 10 and 11, in which a lower temperature prevails in lower zone 10 than in upper zone 11, makes it possible to store objects 13 at very low temperatures.

The same principle can also be applied for climatic cabinets in which objects 13 are stored at elevated temperature. In this case, however, the device shown so far must be inverted, such that the storage zone is formed by upper zone 11, while the lock opening 81 lies in lower zone 10. In this manner it is ensured that the warm air remains in the storage zone when lock opening 81 is opened. Very high temperatures (e.g., 100° C. and higher) can thereby also prevail in the upper zone, in particular when the guides and bearings of the moveable parts are arranged mainly in lower zone 10.

Figure 12:
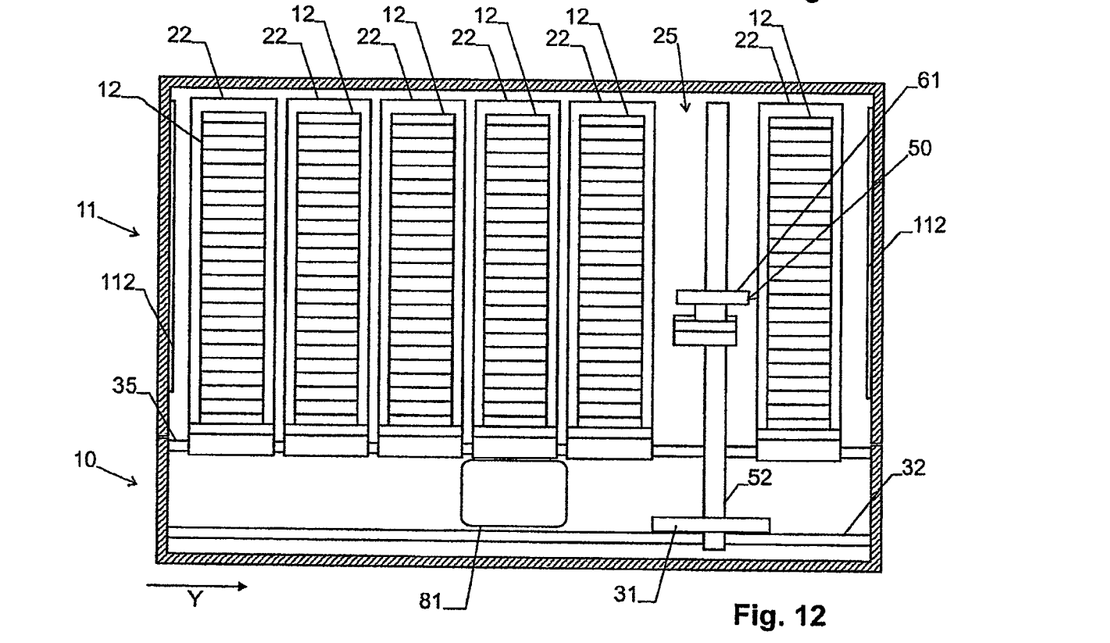
FIG. 12 illustrates a climatic cabinet with high temperature zone.

One example of a device of this type is illustrated in FIG. 12. It uses the construction analogous to that of FIG. 10, but supports 22 are thereby arranged in upper zone 11. Supports 22 are guided in guides 35 in lower zone 10 and displaceable in direction Y. The number of supports 22 is in turn selected such that they fill the space available for them in direction Y up to a transport gap 25. By displacing individual supports 22 in direction Y, transport gap 25 can be formed before each of supports 22, so that the transport mechanism can access the storage locations in cassettes 12.

As can be seen, lift column 52 in this case is supported on a longitudinal guide 32 in lower zone 10 and projects into upper zone 11. It supports lifting device 50 with rotary carriage 61. Lifting device 50 or lift column 52 is in turn horizontally displaceable, namely in direction Y as well as in direction X (where direction X is perpendicular to the drawing plane in FIG. 12). For the displacement in direction X, lift column 52 is supported on a longitudinal shift table 31, analogous to the embodiment 10.

A heater 112 is installed at least in the upper zone for heating.

Instead of the arrangement according to FIG. 12, for a high-temperature climatic cabinet an arrangement according to the embodiments according to FIGS. 3 through 6 can also be used (in this case, however, the carousels are arranged in the upper zone 11) or FIGS. 7 and 8 (with rotary elevators 101 arranged in the upper zone 11) or 11 (with cassettes 12 arranged in the upper zone 11).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

| | |
|---|---|
| 10 | Lower zone |
| 11 | Upper zone |
| 12 | Cassette |
| 13 | Object |
| 14 | Cooling vat |
| 15 | Refrigeration unit |
| 16 | Cover |
| 17 | Dryer |
| 20 | Object storage |
| 21 | Supporting frame |
| 22 | Support |
| 23 | translation drive |
| 23a | Slide sprocket |
| 24 | Aisle |
| 25 | Transport gap |
| 26 | Rotary rod |
| 27 | Rotary plate drive |
| 28 | Rotary plate suspension |
| 29 | Rotary plate |
| 30 | Rotary elevator |
| 31 | Longitudinal shift table |
| 32 | Longitudinal guide |
| 33 | Longitudinal shift drive |
| 41 | Transverse shift table |
| 42 | Transverse guide |
| 43 | Transverse shift drive |
| 50 | Lifting device |
| 51 | Lift carriage |
| 52 | Lift column |
| 53 | Vertical drive |
| 61 | Rotary carriage |
| 63 | Semirotary actuator |
| 72 | Scoop guide |
| 73 | Scoop drive |
| 74 | Scoop |
| 75 | Pull-down claw |
| 81 | Lock |
| 82 | Lock doors |
| 85 | Deposit position |
| 86 | Transfer position |
| 91 | Processing device |
| 92 | Receiving table |
| 100 | Carousel |
| 101 | Rotary elevator |
| 102 | Transport belt |
| 103 | Supporting platforms |
| 104 | Top position |
| 106 | Opening |
| 110, 111 | User doors |
| 112 | Heater |

What is claimed:

1. A climatic cabinet comprising:

an upper zone;

a lower zone;

storage positions for storing objects in one of the upper and lower zone;

a plurality of supports arranged next to one another in a horizontal direction in the lower zone to support the storage positions and to be movable horizontally;

at least one temperature control unit structured and arranged to maintain a temperature in the one of the upper and lower zone different from an other of the upper and lower zone;

a lock;

a horizontal transport mechanism arranged at least in part in the other of the upper and lower zone to move the objects to and from the lock in a direction having a horizontal component; and a vertical transport mechanism structured and arranged to move the objects between the lower zone and the upper zone, wherein the vertical transport mechanism:

comprises a lifting device having a lift column attached in the upper zone and extending into the lower zone; and is horizontally movable in a first and in a second direction, and wherein the climatic cabinet further comprises a drive for displacing the plurality of supports along the horizontal direction in order to form a transport gap between neighboring supports to accommodate the lifting device.

2. The climatic cabinet in accordance with claim 1, wherein the at least one temperature control unit comprises at least one refrigeration unit, the storage positions for storing objects are located in the lower zone, and the lower zone is cooled to a temperature lower than that in the upper zone.

3. The climatic cabinet in accordance with claim 2, further comprising a cooling vat, wherein the storage positions are arranged in the cooling vat.

4. The climatic cabinet in accordance with claim 2, wherein the lock is arranged in the upper zone.

5. The climatic cabinet in accordance with claim 2, further comprising a dryer in the upper zone.

6. The climatic cabinet in accordance with claim 1, further comprising a supporting frame, wherein the supports are suspended in a displaceable manner on the supporting frame.

7. The climatic cabinet in accordance with claim 1, further comprising a plurality of cassettes positionable in the lower zone, wherein each cassette comprises several storage positions one above the other.

8. The climatic cabinet in accordance with claim 7, wherein the plurality of supports are arranged to support the plurality of cassettes, wherein a number of the plurality of cassettes are positionable next to one another in each support.

9. The climatic cabinet in accordance with claim 1, wherein the lifting device comprises a scoop structured and arranged to be pivotable about a vertical axis.

10. A storage cabinet for laboratory articles comprising:
an upper zone;
a storage zone arranged below the upper zone and having storage positions for storing the laboratory articles;
a transport mechanism having a lift carriage movable horizontally and vertically for accessing the storage positions of the storage zone, wherein the transport mechanism comprises a lifting device having a lift column attached in the upper zone and extending into the storage zone;
a plurality of horizontally moveable supports arranged in the storage zone to support the storage positions, wherein each support provides space for several storage positions above one another and next to one another and is suspended from the upper zone;
a plurality of cassettes arranged next to one another in a direction X at each support, wherein each cassette forms several storage positions one above the other;
a drive for displacing the supports horizontally along a direction Y to form a transport gap between supports to accommodate the lift carriage,
wherein the directions X and Y are perpendicular within a horizontal plane.

11. The storage cabinet in accordance with claim 10, wherein said supports form an aisle arranged along direction Y through which a lift column of the transport mechanism is horizontally movable along said direction Y.

12. The storage cabinet in accordance with claim 11, further comprising a lift carriage arranged on the lift column.

13. The storage cabinet in accordance with claim 10, wherein the drive for displacing the support horizontally comprises a translation drive for each support with which the support is displaced horizontally.

14. The storage cabinet in accordance with claim 10, wherein the supports are suspended on two guides lying opposite one another.

15. A climatic cabinet comprising:
an upper zone;
a lower zone;
storage positions structured and arranged to store objects in the lower zone;
at least one refrigeration unit structured and arranged to cool at least the lower zone, whereby a temperature in the lower zone is cooler than a temperature in the upper zone;
a plurality of horizontally moveable supports arranged next to one another in a horizontal direction;
a moving device arranged to move at least some of the plurality of horizontally movable supports along the horizontal direction to form a transport gap between adjacent supports;
a lock in the upper zone; and
a transport mechanism structured and arranged to move the objects between the lower zone and the lock, wherein the transport mechanism comprises a lifting device having a lift column attached in the upper zone and extending into the storage zone.

16. The climatic cabinet in accordance with claim 15, wherein the transport mechanism comprises a horizontal transport mechanism and a vertical transport mechanism.

17. The climatic cabinet in accordance with claim 16, wherein the vertical transport mechanism is structured and arranged to move the objects between the upper zone and the lower zone, and
wherein the horizontal transport mechanism is structured and arranged to move the objects horizontally or obliquely to the lock.

18. A method of transporting objects in a climatic cabinet having an upper zone, a lower zone, a plurality of horizontally moveable supports arranged next to one another in a horizontal direction, and storage positions for storing objects in one of the upper and lower zone, the method comprising:
maintaining a temperature in the one of the upper and lower zone different from an other of the upper and lower zone;
moving at least some of the plurality of horizontally moveable supports along the horizontal direction to form a transport gap between adjacent supports;
moving objects at least in part in the other of the upper and lower zone to move the objects to and from a lock in a direction having a horizontal component; and
moving the objects between the lower zone and the upper zone via a transport mechanism comprising a lifting device having a lift column attached in the upper zone and extending into the storage zone.

19. The method in accordance with claim 18, wherein the temperature in the one of the upper and lower zone is maintained with at least one refrigeration unit, the storage positions for storing objects are located in the lower zone, and the lower zone is cooled to a temperature lower than that in the upper zone.

20. A climatic cabinet comprising:
an upper zone;
a lower zone;
storage positions for storing objects in one of the upper and lower zone;
a plurality of supports arranged in the lower zone to support the storage positions and to be movable by a drive along a horizontal direction Y, wherein the supports are suspended from the upper zone;
a plurality of cassettes supported by said supports in the lower zone, wherein each cassette comprises several storage positions one above the other, wherein a plurality of the cassettes are positioned next to one another along a horizontal direction X in each support, wherein the direction X is perpendicular to the direction Y;

at least one temperature control unit structured and arranged to maintain a temperature in the one of the upper and lower zone different from the other of the upper and lower zone;

a lock;

a horizontal transport mechanism arranged at least in part in the other of the upper and lower zone to move the objects to and from the lock in a direction having a horizontal component; and a vertical transport mechanism structured and arranged to move the objects between the lower zone and the upper zone, wherein the vertical transport mechanism comprises a lifting device having a lift column attached in the upper zone and extending into the storage zone, and wherein the climatic cabinet further comprises a drive for displacing the plurality of supports along the horizontal direction Y in order to form a transport gap between neighboring supports to accommodate the lifting device.

21. The climatic cabinet in accordance with claim 20, wherein the lifting device is horizontally movable in a first and in a second direction.

\* \* \* \* \*